(12) United States Patent
Olsson

(10) Patent No.: US 10,670,688 B2
(45) Date of Patent: Jun. 2, 2020

(54) METHOD AND TOOL FOR REFLECTOR ALIGNMENT

(71) Applicant: Telefonaktiebolaget LM Ericsson (publ), Stockholm (SE)

(72) Inventor: Bengt-Erik Olsson, Hovås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 15/761,161

(22) PCT Filed: Oct. 13, 2015

(86) PCT No.: PCT/EP2015/073729
§ 371 (c)(1),
(2) Date: Mar. 19, 2018

(87) PCT Pub. No.: WO2017/063681
PCT Pub. Date: Apr. 20, 2017

(65) Prior Publication Data
US 2018/0259612 A1   Sep. 13, 2018

(51) Int. Cl.
*H01Q 19/10* (2006.01)
*G01S 3/782* (2006.01)
*H01Q 1/12* (2006.01)
*H01Q 3/00* (2006.01)
*H01Q 3/08* (2006.01)
*H01Q 1/22* (2006.01)

(52) U.S. Cl.
CPC ............. *G01S 3/782* (2013.01); *H01Q 1/125* (2013.01); *H01Q 1/22* (2013.01); *H01Q 3/005* (2013.01); *H01Q 3/08* (2013.01); *H01Q 19/104* (2013.01)

(58) Field of Classification Search
CPC ....... G01S 3/782; H01Q 19/10; H01Q 19/104
USPC .......................................................... 33/277
See application file for complete search history.

(56) References Cited

U.S. PATENT DOCUMENTS 2,090,658 A * 8/1937 Zak ........................ G01B 3/56
                                                        33/262
2,330,414 A * 9/1943 Elwert ..................... G01C 3/22
                                                        33/277

(Continued)

FOREIGN PATENT DOCUMENTS

WO    WO 2014/161566 A1    10/2014
WO    WO-2015106813 A1 *   7/2015   .............. H01Q 3/02

OTHER PUBLICATIONS

International Search Report and Written Opinion of the International Searching Authority for International Application No. PCT/EP2015/073729 dated Jun. 22, 2016, 9 pages.

*Primary Examiner* — Christopher W Fulton
(74) *Attorney, Agent, or Firm* — Sage Patent Group

(57) ABSTRACT

An alignment tool and a method are disclosed for alignment of a reflector arrangement. The reflector arrangement comprises a flat reflective surface which is configured to reflect an electromagnetic wave signal between a first antenna site and a second antenna site. The alignment tool comprises a camera circuit for capturing images of a field-of-view, an input circuit configured to receive a user input comprising the field-of-view coordinates of the first antenna site, a processing circuit configured to compute alignment information from the user input, and a display circuit configured to display the field-of-view and the alignment information.

14 Claims, 7 Drawing Sheets

(56) References Cited

U.S. PATENT DOCUMENTS

| | | | | |
|---|---|---|---|---|
| 2,679,105 | A | * | 5/1954 | Herrick .................. A01K 97/00 33/277 |
| 3,859,731 | A | * | 1/1975 | Endo ...................... G01C 11/04 33/227 |
| 3,876,313 | A | * | 4/1975 | Messier .................. G01C 1/02 356/255 |
| 4,510,695 | A | * | 4/1985 | Leitz ....................... G01C 3/00 33/277 |
| 5,379,045 | A | * | 1/1995 | Gilbert .................. G01C 15/00 342/352 |
| 6,995,836 | B1 | * | 2/2006 | Tondorf .................. G01D 5/26 356/138 |
| 2006/0236553 | A1 | * | 10/2006 | Chas ..................... G01C 21/20 33/277 |
| 2008/0284669 | A1 | | 11/2008 | Hunton et al. |
| 2014/0205205 | A1 | | 7/2014 | Neubauer |
| 2016/0056525 | A1 | * | 2/2016 | Hansryd .............. H01Q 1/1257 |
| 2019/0146419 | A1 | * | 5/2019 | Organ .................... G04B 49/04 33/228 |

* cited by examiner

METHOD AND TOOL FOR REFLECTOR ALIGNMENT

CROSS REFERENCE TO RELATED APPLICATION

This application is a 35 U.S.C. § 371 national stage application of PCT International Application No. PCT/EP2015/073729, filed on Oct. 13, 2015, the disclosure and content of which is incorporated by reference herein in its entirety.

TECHNICAL FIELD

Embodiments presented herein relate to a method and tool for alignment of a reflector arrangement in a non-line-of-sight point-to-point radio communication system.

BACKGROUND

Non-line-of-sight (NLOS) point-to-point radio communication is attractive for backhauling small-cell radio base stations (RBS) in urban environment where line-of-sight (LOS) communication is not feasible or too expensive. NLOS operation of microwave links primarily utilizes two physical mechanisms, diffraction and reflection, to bypass obstacles. For some high frequency radio links, in particular links operating at 60 GHz and beyond, diffraction does not allow sufficient power budget due to very high loss and therefore reflection must be the main effect utilized. However, in reality reflections are difficult to use since there must be a wall with correct orientation angle that provides a reflection point connecting the two sites.

FIG. 1 depicts two sites in NLOS condition connected by reflection in a wall. The path by point A works fine while the path by point B does not. For a given geometry there exists only a single point satisfying the law of reflection, i.e. output angle relative the normal to the surface equals the input angle. According to the law of reflection, in FIG. 1, only point A constitutes a reflection point between the two antenna sites, whereas point B does not. Note that the law of reflection must be fulfilled in two dimensions when the first antenna site and the second antenna site are at different heights. In addition, the reflection loss must be stable and sufficiently low in the reflection point which implies that no uneven or movable objects should be present in this point, e.g. balconies, signs, or windows that can be opened. In reality this means that suitable reflection points are very difficult to find and even if there exists a wall at roughly the correct area, the wall may not be possible to use either due to wrong angle, too high loss, or movable items in the way. Another problem hampering large scale NLOS deployment is the difficulty of planning an NLOS link. Without knowledge about the obstacles, e.g. building facades, trees and signs, it is very difficult to plan an NLOS link and would require a visit to the area in order to acquire detailed measurements of the surroundings.

An attractive solution to the problems mentioned above, is to mount reflectors at suitable places that can be aligned to fulfil the law of reflection between the desired sites. At high microwave frequencies such reflector can be small, e.g. below a meter in diameter, and be made almost invisible, e.g. painted with appropriate color or even made in glass (armored with metal). This solution makes it possible to engineer an NLOS link with low loss and stable performance still with high system margin. FIG. 2 exemplifies a path assisted by an alignable passive reflector.

In FIG. 2 the LOS path between a first antenna site and second antenna site is blocked by a building. An NLOS path can be created by mounting a passive reflector 220 at a third site that is positioned such that the law of reflection is fulfilled. Hence, a radio link between the first antenna site and the second antenna site is possible. Another solution could of course be to put active repeaters the third site or on top of the blocking building. However, active repeater would require electricity and access rights for servicing and would thus be a much more expensive solution. The use of passive reflectors allows for very low cost installation both from a reliability point of view and space rental cost. Passive reflectors can also be used in free-space optical (FSO) links to enable NLOS deployment. In such links, the lenses can be very small, e.g. in the diameter range of a few centimeters or decimeters.

The main problem is then how to align the passive reflectors so they accomplish the situation exemplified by point A in FIG. 1. Some suggestions have been to use temporary radio receivers that line up with the reflector in correct directions. This solution is rather complicated and requires the equipment at the first antenna site and the second antenna site to be mounted and almost correctly aligned and must of course be powered on. Thus commissioning such link is difficult. Another solution is to put two temporary radios at the reflection site and align the first part of the link thereafter the second part of the link. When we know that the radios at the two antenna sites are correctly aligned, the reflector is aligned by remotely monitor the received power at one or both of the two antenna sites. Also this installation method is very tedious and requires expensive equipment.

The above methods for alignment of a passive reflector for NLOS radio links are complicated, take long time and require the radio link to be powered on. Thus massive low-cost deployment is not possible. Hence, there is a need for improved method and tools for alignment of a passive reflector for NLOS applications.

SUMMARY

It is an object of the present invention to remedy, or at least alleviate, some of these drawbacks and to provide an efficient method and tool for alignment of a reflector arrangement. This is provided in a number of aspects of the present invention described below.

According to a first aspect, the invention describes an alignment tool for a reflector arrangement, the reflector arrangement comprising a flat reflective surface configured to reflect an electromagnetic wave signal between a first antenna site and a second antenna site. The alignment tool being characterized by comprising: a camera module for capturing images of a field-of-view, wherein the camera module is configured to be mounted on the reflector arrangement such that the field-of-view is pointing in a direction perpendicular to the flat reflective surface; an input module configured to receive a user input, wherein the user input comprises the field-of-view coordinates of the first antenna site; a processing module configured to compute alignment information from the user input by applying the rule that the incident and the reflected angles to the flat reflective surface are equal in magnitude but opposite in sign; and a display module configured to display the field-of-view and the alignment information. In one implementation of the first aspect, the alignment information comprises the field-of-view coordinates of the target reflection point to the first antenna site. In yet another implementation of the first aspect, the user input further comprises the field-of-view coordinates of the second antenna site and the alignment information comprises the field-of-view coordinates of the midpoint between the first antenna site and the second antenna site. In yet another implementation of the first aspect, the processing module is further configured to compute a motion vector between the field-of-view image before and the field-of-view image after the adjustment of the flat reflective surface and to compute an updated user input by adding the motion vector to the user input.

According to a second aspect, the invention describes a method for alignment of a reflector arrangement, the reflector arrangement comprising a flat reflective surface configured to reflect a millimeter wave signal between a first antenna site and a second antenna site. The method for alignment of the reflector arrangement comprising the steps of: mounting a camera module on the reflector arrangement, the camera module being configured for capturing images of a field-of-view, and the mounting being performed such that the field-of-view is pointing in a direction perpendicular to the flat reflective surface; and receiving a user input from an input module, wherein the user input comprises the field-of-view coordinates of the first antenna site; computing alignment information from the user input in a processing module, wherein the alignment information is computed by following the rule that the incident and the reflected angles to the flat reflective surface are equal magnitude but opposite in sign; and displaying the field-of-view and the alignment information on a display module. In one implementation of the second aspect, the alignment information comprises the field-of-view coordinates of the target reflection point to the first antenna site. In another implementation of the second aspect, the user input further comprises the field-of-view coordinates of the second antenna site and the alignment information comprises the field-of-view coordinates of the midpoint between the first antenna site and the second antenna site. In yet another implementation of the second aspect, the computing further comprises computing a motion vector between the field-of-view image before and the field-of-view image after adjustment of the flat reflective surface and computing an updated user input by adding the motion vector to the user input.

The above alignment tool and method have the advantage of a much simplified installation procedure which reduces the time needed for installation. Moreover, the radio link does not need to be powered on during installation. Thus low-cost deployment of NLOS radio links will be feasible on a much larger scale.

The drawings are not necessarily to scale and the dimensions of certain features may have been exaggerated for the sake of clarity, emphasis is instead being placed upon illustrating the principle of the embodiments herein.

DETAILED DESCRIPTION

Four embodiments of the present invention are described in detail below with reference to FIGS. 2-7. A first and a second embodiment of the invention relate to an alignment tool 320 for a reflector arrangement 220. A third and fourth embodiment of the invention relate to a method for alignment of a reflector arrangement 220. It should be noted that the scope of the present invention is not limited to the particular embodiments described herein, but only limited by the appended claims.

Figure 1:
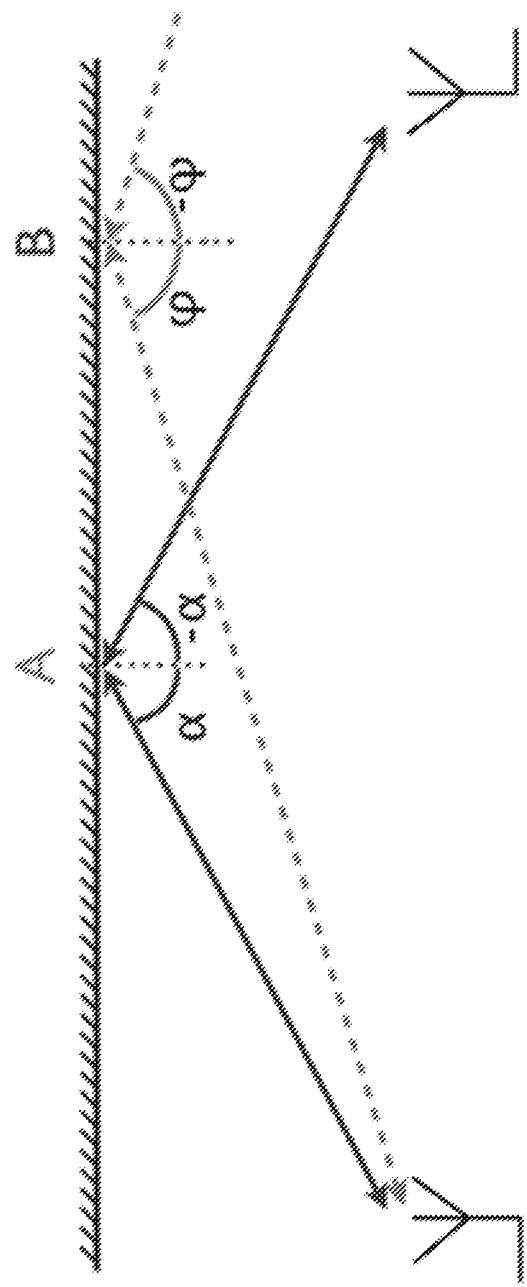
FIG. 1 shows schematically the principle of the law of reflection and how it applies to an NLOS radio link.
Figure 2:
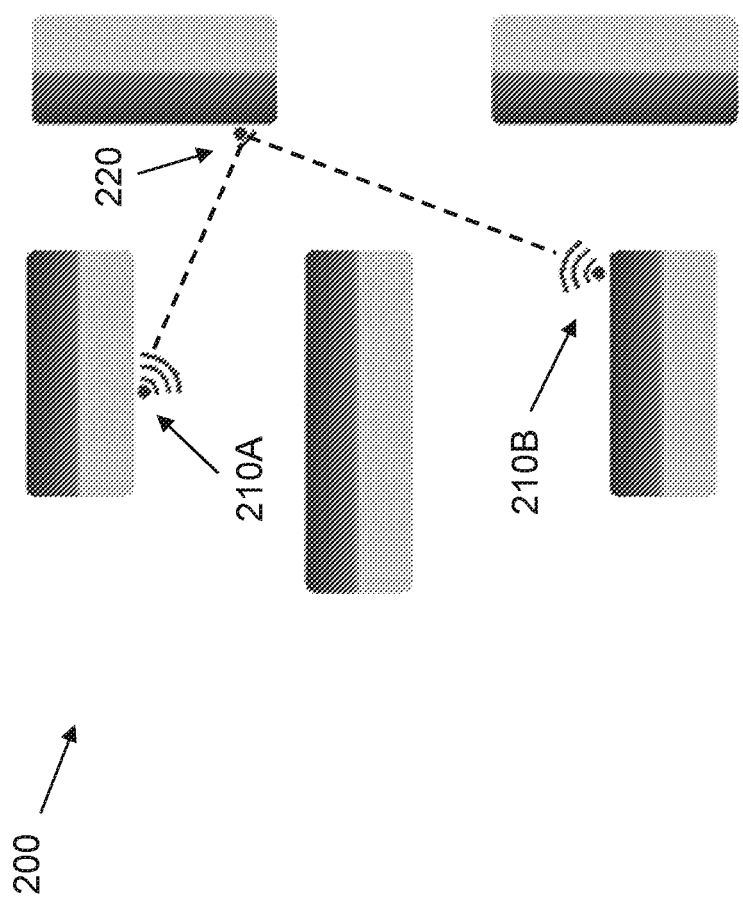
FIG. 2 shows schematically an NLOS point-to-point radio link that uses a passive reflector to bypass a building.
Figure 3:
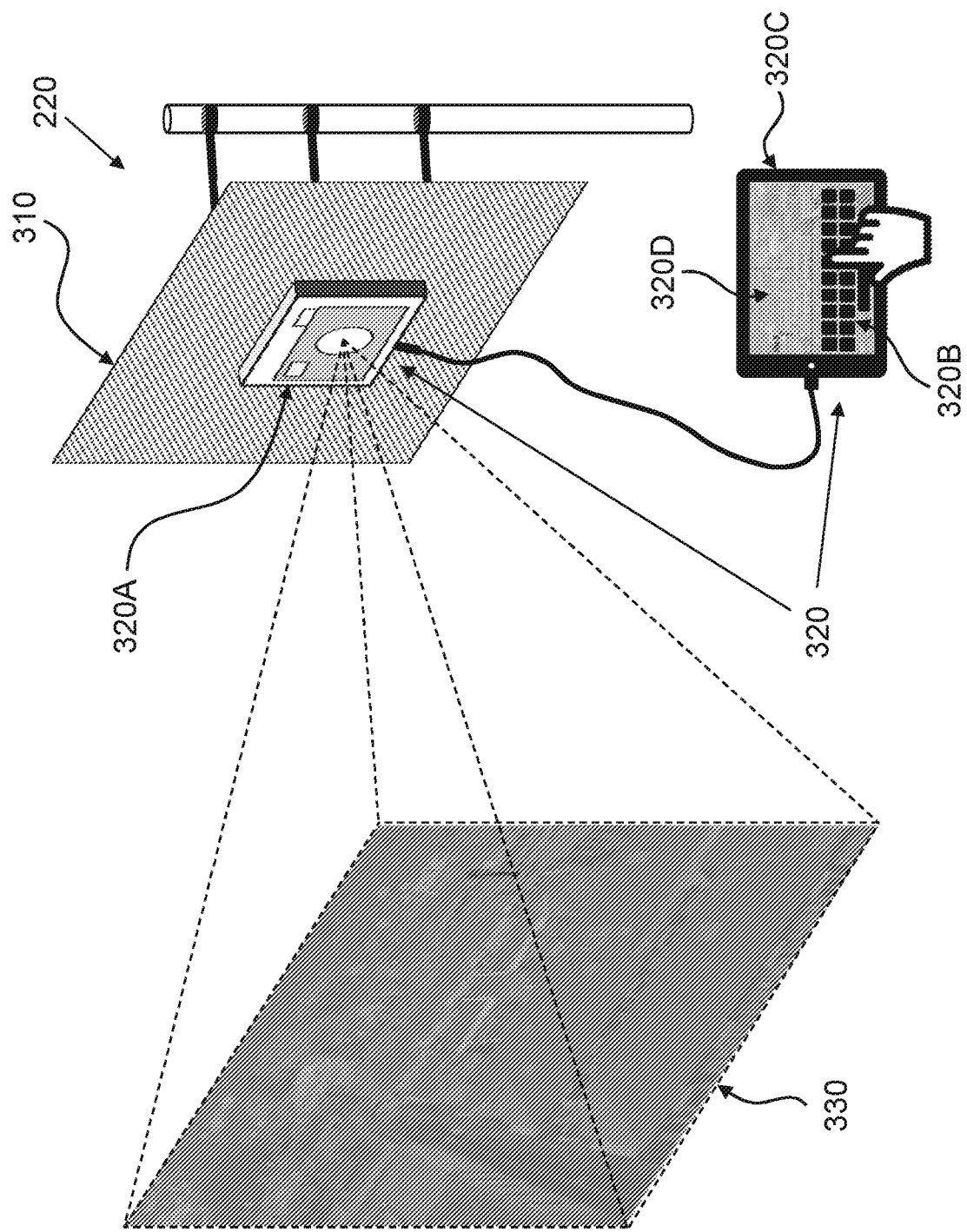
FIG. 3 shows schematically an alignment tool for alignment of a reflector arrangement.

In the following, common features of the first and second embodiments are described with reference to FIG. 3.

The first and the second embodiment of the invention relate to an alignment tool 320 for the reflector arrangement 220. The reflector arrangement is typically part of a non-line-of-sight, NLOS, point-to-point communication system 200. The reflector arrangement 220 is normally a passive reflector, e.g. a mirror, an armored glass surface or any type of reflective surface. Alternatively, the reflector arrangement may be an active reflector, e.g. a repeater. The reflector arrangement comprises a flat reflective surface 310 configured to reflect an electromagnetic wave signal between a first antenna site 210A and a second antenna site 210B. The electromagnetic wave signal may be a millimeter wave signal or an optical signal. The reflector arrangement 220 further comprises means for mounting the flat reflective surface 310 to a structure, e.g. a mast, a building or a lamppost. Preferably, such means for mounting permit angular adjustment of the flat reflective surface 310 about the horizontal and the vertical axes.

According to the first and second embodiments, the alignment tool 320 comprises a camera module 320A configured to capture images of a field-of-view 330, in which the camera module 320A is configured to be mounted on the reflector arrangement 220 such that the field-of-view is pointing in a direction perpendicular to the flat reflective surface 310. Preferably, the camera module 320A is configured to be mounted directly on the flat reflective surface 310 such that the field-of-view is pointing in a direction perpendicular to the flat reflective surface 310.

According to the first and second embodiments, the alignment tool 320 further comprises an input module 320B configured to receive a user input of the location of the first antenna site as field-of-view coordinates. The input module 320B is preferably a touch sensitive display showing the field-of-view of the camera module. The user input may be received by the user touching the touch sensitive display at the location of the first antenna site. Alternatively, the input module 320B may be a keyboard, mouse, touch pad or any other type of input device. The field-of-view coordinates may be represented by any coordinate system that can represent a point in a two-dimensional field-of-view. The field-of-view coordinate system uniquely defines each point in the image taken by the camera module. The coordinate system normally comprises both vertical and horizontal coordinates. In one preferred coordinate system, the horizontal coordinate is represented by X, the vertical coordinate is represented by Y, the center point of the field-of-view has the coordinates $X=0$ and $Y=0$, any coordinate to the right of the center point has $X>0$, any coordinate to the left of the center point has X<0, any coordinate above the centre point has Y>0 and any coordinate below the centre point has Y<0.

According to the first and second embodiments, the alignment tool 320 further comprises a processing module 320C configured to compute alignment information from the user input by applying the rule that the incident and the reflected angles to the flat reflective surface are equal in magnitude but opposite in sign, i.e. the law of reflection. Here the incident angle is the angle between the normal vector of the flat reflective surface and the incoming electromagnetic wave signal. The reflected angle is the angle between the normal vector of the flat reflective surface and the outgoing reflected electromagnetic wave signal. Normally, the law of reflection would require three dimensional coordinates of the locations of the antenna sites, however, by having the field-of-view of the camera module pointing in the same direction as the normal vector of the flat reflective surface, i.e. perpendicular to the flat reflective surface, and the field-of-view coordinates of at least one antenna site known, one can fully determine the target reflection point of the outgoing electromagnetic wave signal. Since the behaviour of reflector can be fully determined, alignment information on how to adjust the reflector arrangement can also be computed. Two examples on how to compute alignment information can be found further down in the text where unique features of the first and second embodiments are described.

According to the first and second embodiments, the alignment tool 320 also comprises a display module 320D configured to display the field-of-view and the alignment information. The display module 320D may also be configured to display a zoomed-in part of the field-of-view.

Preferably, the input module 320B, the processing module 320C and display module 320D are comprised in a portable device connected to the camera module 320A. For example, the portable device may be a mobile phone, a tablet computer or a laptop computer. The portable device is preferably wirelessly connected to the camera module 320A.

In the following, technical features unique to the first embodiment are described.

In the first embodiment of the invention, the alignment information is the field-of-view coordinates of the target reflection point of the outgoing reflected electromagnetic wave signal. The coordinates of the target reflection point is obtained by adhering to the law of reflection. For example, in case of the preferred coordinate systems, the coordinates of the target reflection point is obtained by taking the negation of the coordinates of the first antenna site, $X_T = -X_1$, $Y_T = -Y_1$.

The processing module may also be configured to compute adjusted coordinates of $X_1$ and $Y_1$ when the field-of-view changes due to adjustment of the flat reflective surface 310. The adjusted coordinates may then be determined by computing a motion vector between the field-of-view image before and after the adjustment. By adding the motion vector to the original coordinates of $X_1$ and $Y_1$, the user does not have to provide a new user input when the flat reflective surface is adjusted. Note that many examples on how to compute motion vectors are known in the literature. Preferably, if the camera module supports MPEG or H.264 video encoding, the motion vectors can be extracted directly from the encoded MPEG or H.264 video streams. Alternatively, the motion vector can be obtained by a compass and/or an accelerometer that tracks the movements of the flat reflective surface 310.

Figure 4:
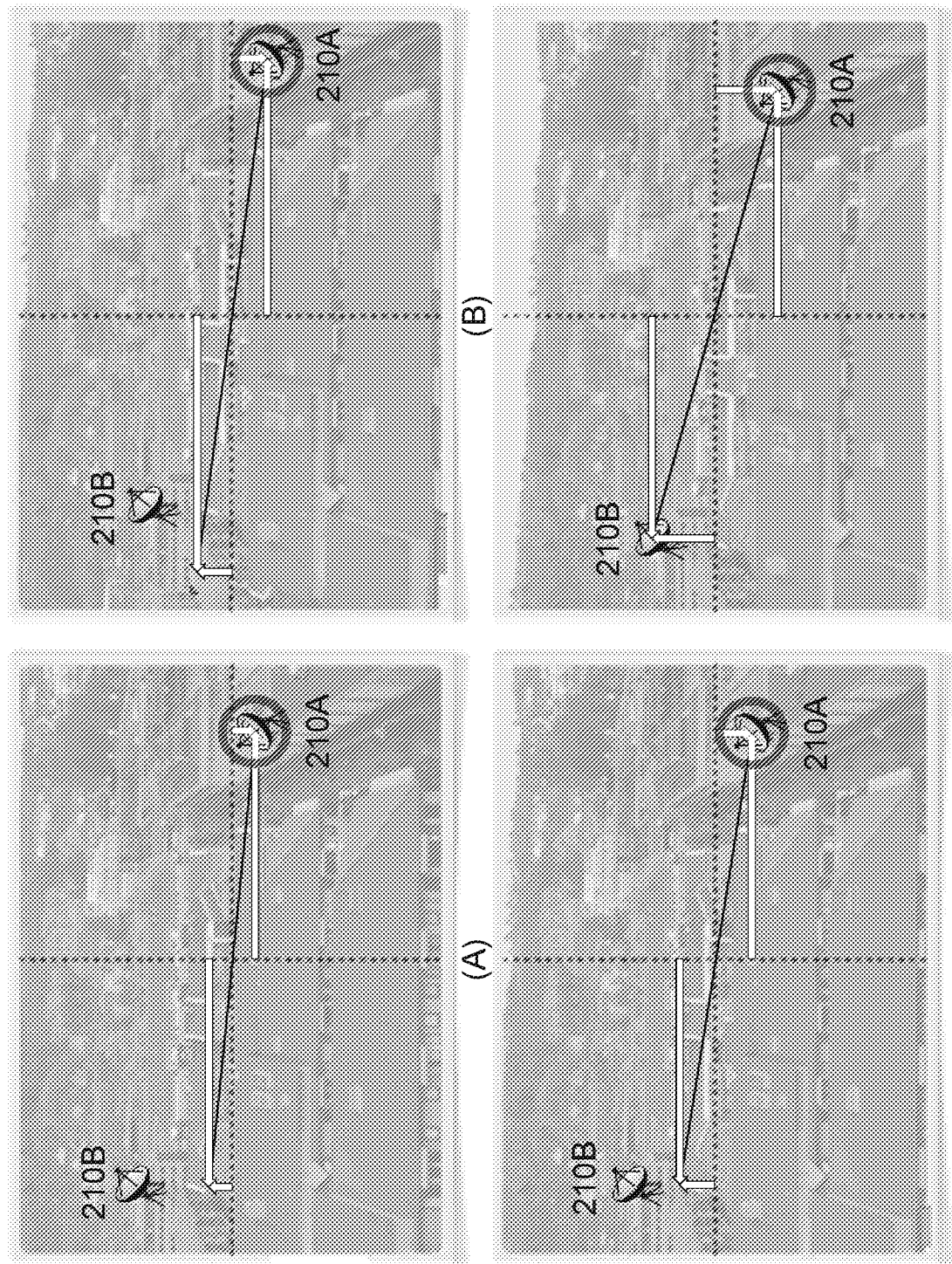
FIG. 4 shows four exemplary alignment steps when the field-of-view coordinates of a first antenna site have been provided by the user.

The purpose of the alignment information is to provide guidance to the user for correct alignment of the flat reflective surface 310. FIG. 4 illustrates four exemplary steps of the alignment process of the reflector arrangement according to the first embodiment. In FIG. 4, the location of the first antenna site as field-of-view coordinates has been received (by input module 320B) and is marked by a circle. The target reflection point, computed by the processing module 320B, is in this example illustrated by two arrows pointing at the coordinates $X_T = -X_1$ and $Y_T = -Y_1$. By adjusting the flat reflective surface 310, the field-of-view changes and consequently also the coordinates of the first antenna site $(X_1, Y_1)$ and alignment information, i.e. the target reflection point $(X_T, Y_T)$. Correct alignment of the reflector arrangement 220 is achieved when the target reflection point $(X_T, Y_T)$ and the second antenna site 210B have the same location. FIG. 4D illustrates correct alignment of the reflector arrangement 220.

In the following, technical features unique to the second embodiment are described.

In the second embodiment of the invention, the user input further comprises the field-of-view coordinates of the second antenna site 210B and the alignment information comprises the field-of-view coordinates of the midpoint between the first antenna site and the second antenna site. The processing module 320C configured to compute alignment information from the user input. In the second embodiment, the alignment information indicates the direction in which the flat reflective surface should be pointing. By adhering to the law of reflection, a new center point is computed as the midpoint between the two antenna sites. The new center point has the field-of-view coordinates $X_{MP} = (X_1 + X_2)/2$ and $X_{MP} = (X_1 + X_2)/2$. Similarly to the first embodiment, the processing module may be configured to compute adjusted coordinates of $X_1$, $X_2$, $Y_1$ and $Y_2$ when the field-of-view changes due to adjustment of the flat reflective surface 310. By adding the motion vector to the original coordinates of $X_1$, $X_2$, $Y_1$ and $Y_2$, the user does not have to provide a new user input when the flat reflective surface is adjusted.

Figure 5:
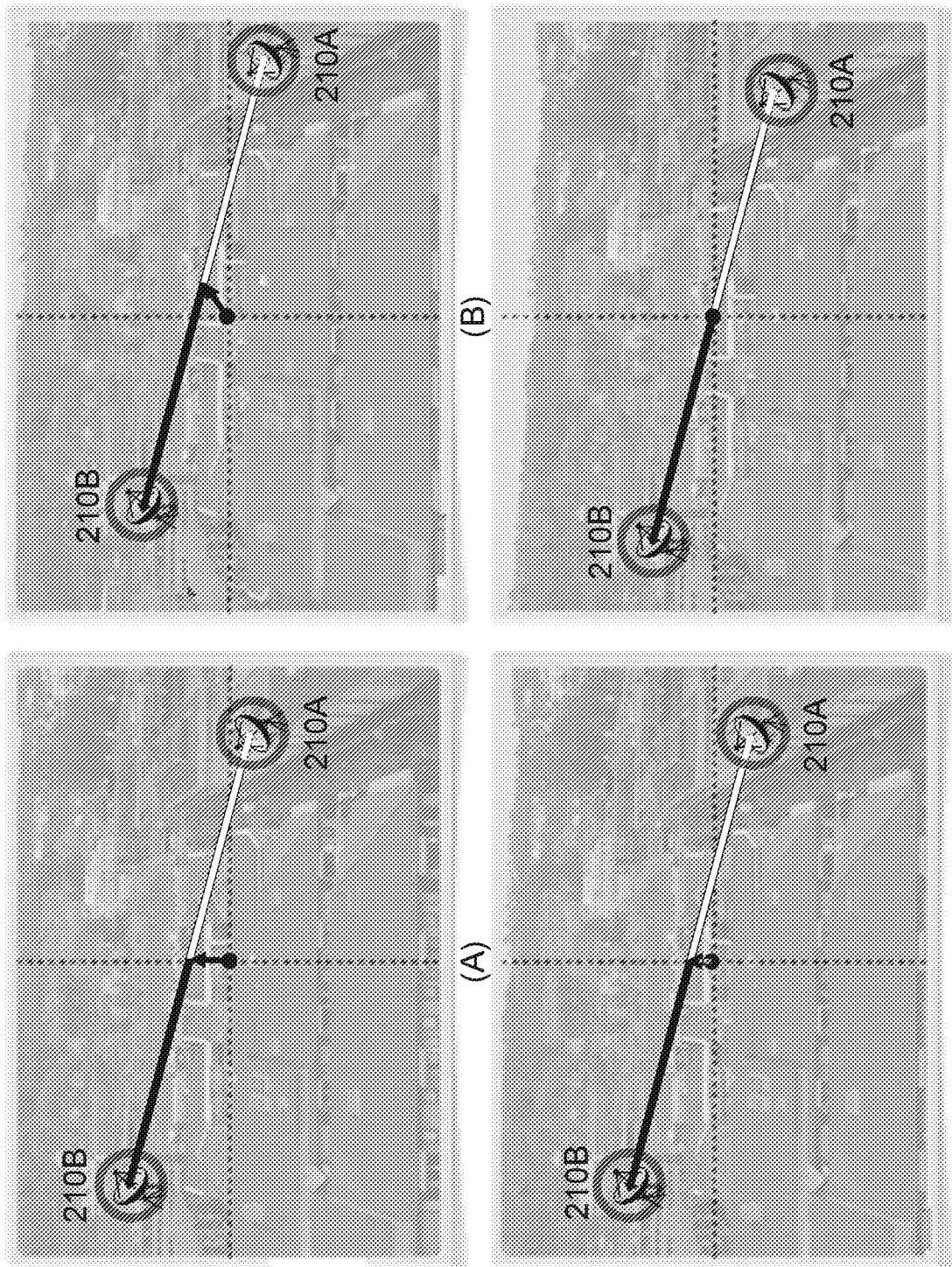
FIG. 5 shows four exemplary alignment steps when the field-of-view coordinates of a first antenna site and a second antenna site have been provided by the user.

The purpose of the alignment information is to provide guidance to the user for correct alignment of the flat reflective surface 310. FIG. 5 illustrates four exemplary steps of the alignment process with the alignment tool 320 according to the second embodiment. In FIG. 5, the locations of the first antenna site and second antenna sites as field-of-view coordinates have been received (by input module 320B) and are marked by circles. The midpoint, computed by the processing module 320B, is in this example illustrated by a vector from the center of the field of view (i.e. X=0 and Y=0) to the midpoint (i.e. $X_{MP}$ and $Y_{MP}$). By adjusting the flat reflective surface 310, the field-of-view changes and consequently the coordinates of the two antenna sites $(X_1, X_2, Y_1$ and $Y_2)$ and the midpoint $(X_{MP}, Y_{MP})$. FIG. 5D illustrates the correct alignment of the reflector arrangement 220.

Figure 6:
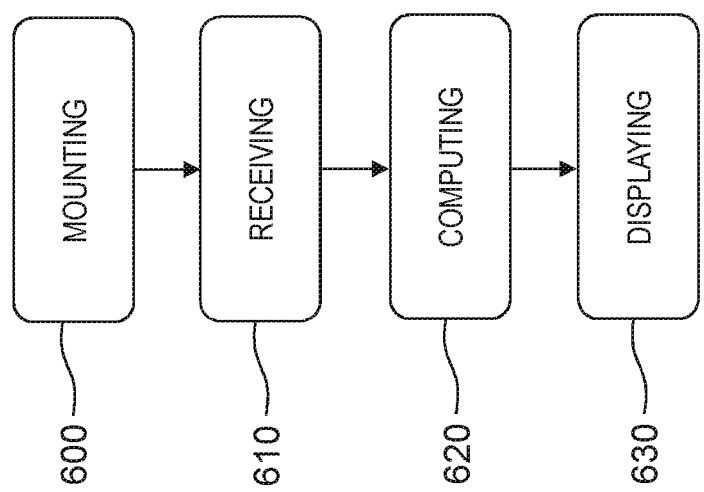
FIG. 6 shows schematically a flowchart of a method for alignment of a reflector arrangement.

In the following, common features of the third and fourth embodiments are described with reference to FIG. 6.

The third and the fourth embodiments of the invention relate to a method for alignment of a reflector arrangement 220. The reflector arrangement comprises a flat reflective surface 310 configured to reflect an electromagnetic wave signal between a first antenna site 210A and a second antenna site 210B. The electromagnetic wave signal may be a millimeter wave signal or an optical signal. The reflector arrangement 220 further comprises means for mounting the flat reflective surface 310 to a structure, e.g. a mast, a building or a lamppost. Preferably, such means for mounting permit angular adjustment of the flat reflective surface 310 about the horizontal and the vertical axes.

According to the third and fourth embodiments, the method for alignment comprises the step of mounting 600 a camera module 320A on the reflector arrangement 220, in which the camera module is configured for capturing images of a field-of-view 330 and the mounting is performed such that the field-of-view is pointing in a direction perpendicular to the flat reflective surface 310. Preferably, the step of mounting the camera module 320A comprises mounting the camera module directly onto the flat reflective surface 310.

According to the third and fourth embodiments, the method for alignment further comprises receiving 610 a user input from an input module 320B, in which the user input comprises the location of a first antenna 210A site as field-of-view coordinates. The input module 320B is preferably a touch sensitive display showing the field-of-view of the camera module. Receiving 610 the user input may comprise the user touching the touch sensitive display at the location of the first antenna site. Alternatively, the input module 320B may be a keyboard, mouse, touch pad or any other type of input device. The field-of-view coordinates may be represented by any coordinate system that can represent a point in a two-dimensional field-of-view. The preferred coordinate system is the same as for the first and second embodiments.

According to the third and fourth embodiments, the method for alignment further comprises computing 620 alignment information from the user input in a processing module 320C. Computing the alignment information is achieved by adhering to the rule that the incident and the reflected angles to the flat reflective surface are equal in magnitude but opposite in sign, i.e. the law of reflection. Here the incident angle is the angle between the normal vector of the flat reflective surface and the incoming electromagnetic wave signal. The reflected angle is the angle between the normal vector of the flat reflective surface and the outgoing reflected electromagnetic wave signal. Normally, the law of reflection would require three dimensional coordinates of the locations of the antenna sites, however, by having the field-of-view of the camera module pointing in the same direction as the normal vector of the flat reflective surface, i.e. perpendicular to the flat reflective surface, and the location of at least one antenna site known, one can fully determine the target reflection point of the outgoing electromagnetic wave signal. Since the behaviour of reflector arrangement can be fully determined, computing alignment information on how to adjust the reflector arrangement is also possible. Two examples on computing the alignment information can be found further down in the text where unique features of the third and fourth embodiments are described.

The method of the third and fourth embodiments also comprises displaying 630 the field-of-view and the alignment information on a display module 320D. The displayed alignment information provides guidance to the user in the alignment process of the flat reflective surface 310. The display module 320D may also be configured to display a zoomed-in part of the field-of-view.

In the following, technical features unique to the third embodiment are described.

In the third embodiment, the alignment information comprises the field-of-view coordinates of the target reflection point to the first antenna site. Here the target reflection point is the location that will be hit by the outgoing reflected electromagnetic wave signal. Hence, the computing 620 comprises computing the field-of-view coordinates of the target reflection point of the first antenna site. Since the location of the first antenna site is known and the camera module is pointing in a direction perpendicular to the flat reflective surface, the field-of-view coordinates of the target reflection point can be obtained by adhering to the law of reflection. In case of the preferred coordinate systems, computing 620 the coordinates of the target reflection point comprises taking the negation of the coordinates of the first antenna site, $X_T=-X_1$, $Y_T=-Y_1$.

Computing 620 may also comprise computing adjusted coordinates of $X_1$ and $Y_1$ when the field-of-view changes due to adjustment of the flat reflective surface 310. The adjusted coordinates may then be determined by computing a motion vector between the field-of-view image before and after the adjustment. By adding the motion vector to the original coordinates of $X_1$ and $Y_1$, the user does not have to provide a new user input after having adjusted the flat reflective surface.

The purpose of the alignment information is to provide guidance to the user for correct alignment of the flat reflective surface 310. In FIG. 4, four exemplary steps of the alignment process of the reflector arrangement according to the first embodiment are shown. The location of the first antenna site as field-of-view coordinates has been obtained (by input module 320B) and is marked by a circle. The target reflection point, computed by the processing module 320B, is in this example illustrated by two arrows pointing at the coordinates $X_T=-X_1$ and $Y_T=-Y_1$. By adjusting the flat reflective surface 310, the field-of-view changes and consequently the coordinates of the first antenna site $(X_1, Y_1)$ and the target reflection point $(X_T, Y_T)$. The bottom right image of FIG. 4D illustrates the correct alignment of the reflector arrangement 220.

In the following, technical features unique to the fourth embodiment are described.

In the fourth embodiment, the user input further comprises the field-of-view coordinates of the second antenna site 210B and the alignment information comprises the field-of-view coordinates of the midpoint between the first antenna site 210A and the second antenna site 210B. Here the alignment information indicates the desired direction in which the flat reflective surface should be pointing. By adhering to the law of reflection, a new center point is computed as the midpoint between the two antenna sites, with the field-of-view coordinates $X_{MP}=(X_1+X_2)/2$ and $Y_{MP}=(Y_1+Y_2)/2$.

Computing 620 may also comprise computing adjusted coordinates of $X_1$, $X_2$, $Y_1$ and $Y_2$ when the field-of-view changes due to adjustment of the flat reflective surface 310. The adjusted coordinates may be determined by computing a motion vector between the field-of-view image before and after the adjustment. By adding the motion vector to the original coordinates of $X_1$, $X_2$, $Y_1$ and $Y_2$, the user does not have to provide a new user input when the flat reflective surface has been adjusted.

The purpose of the alignment information is to provide guidance to the user for correct alignment of the flat reflective surface 310. FIG. 5 illustrates four exemplary steps of the alignment process of the reflector arrangement according to the fourth embodiment. In FIG. 5, the locations of the first antenna site and second antenna sites as field-of-view coordinates has been received (by input module 320B) and are marked by circles. The midpoint, computed by the processing module 320B, is in this example illustrated by a vector from the center of the field of view (i.e. X=0 and Y=0) to the midpoint (i.e. $X_{MP}$ and $Y_{MP}$). By adjusting the flat reflective surface 310, the field-of-view changes and consequently the coordinates of the two antenna sites ($X_1$, $X_2$, $Y_1$ and $Y_2$) and the midpoint ($X_{MP}$, $Y_{MP}$). FIG. 5D illustrates the correct alignment of the reflector arrangement 220.

In the following, certain aspects of the invention with reference to FIG. 4 are described. FIG. 4 shows the principle of connecting two positions in a picture with a reflection path, where the reflection point is in the center of a camera lens taking the picture. The picture on the screen shows the view as if the flat reflective surface views it. The process is now the following: The two sites to be connected are identified and denoted the first antenna site 210A and the second antenna site 210B. The user marks the first antenna site 210A on the display and the corresponding position connecting site 210A with the current position of the flat reflective surface is calculated and showed as the target reflection point on the screen. The user now sees that the target reflection point is not at the second antenna site 210B and adjusts the flat reflective surface about the horizontal and vertical axes such that target reflection point is in the correct horizontal position of the second antenna site, as shown in FIG. 4C. The user then tilts the reflector arrangement in the vertical direction such that the target reflection point appears at the second antenna site 210B, as shown in FIG. 4D. The passive reflector arrangement thus connects the first antenna site 210A with the second antenna site 210B. Once the location of the first antenna site has been provided the software can automatically track the position of the first antenna site, by use of pattern recognition or tilt sensors, and continuously calculate target reflection point. In this way the user/operator does not need to mark position iteratively and the alignment in horizontal and vertical directions can be very easy and intuitive. Note that a slight shift in relative positions of the first antenna site 210A and the second antenna site 210B might occur when the camera module is tilted. However, due to the relatively large distances between the reflector arrangement 220 and the antenna sites, this will not have any significant impact.

In the following, some additional implementation aspects are discussed.

One preferred implementation of the alignment tool is as support software in a device such as an iPad, a tablet or a smartphone. The software utilizes input/output components in the device such as camera, touch screen, accelerometers, gyros, compass to obtain adequate input to the calculations. The reflector arrangement is often mounted on the wall of a building and the user/operator usually goes up in a bucket truck to mount and align the reflector arrangement. Thus it is preferred to use a camera facing the same side as the screen, which is found on most iPads and similar devices for the purpose of video calls. A potential draw back with this is that the user must stay below the camera lens. A better solution may then be to connect an external camera that aligns with the center normal to the reflector. Normal low-cost cameras found on iPads, tablets and smartphones have a typical view angle of about 50 degrees. This may not always be sufficient to capture both the first antenna site 210A and the second antenna site 210B, but a second camera lens can then preferably be mounted on top of the original lens. Such add-on wide-angle lenses are available from many vendors. Another potential issue with low cost camera lenses are that they may suffer from astigmatism which distort the picture and make the sites in the picture not appear at exactly the correct place. This problem can be solved either by using lenses of sufficient quality or by calibrating the actual lens. However, this is not a major issue as long as the lenses are symmetrical around the center point of the lens. Although the preferred implementation of the invention is an iPad, tablet or smartphone with support software, it should be noted that a dedicated device can also be assembled specifically for the alignment purpose.

Another aspect of the invention is that the location of the first antenna site 210A and the second antenna site 210B, including the antenna heights above ground, may be entered into the device software and the software then calculates a proposed shift in tilt relative the actual device tilt. This information may be presented with marks and arrows on the screen.

Another implementation aspect to consider is that error in the measurements may arise from that the camera is not in the reflection point on the passive reflector. However, such an error may be calibrated away provided that the lens offset as well as approximate distances to the sites are known. For microwave frequencies this error is likely of minor impact due to much wider beam, usually hitting the whole reflector. In this case the position of the camera lens is not critical.

Figure 7:
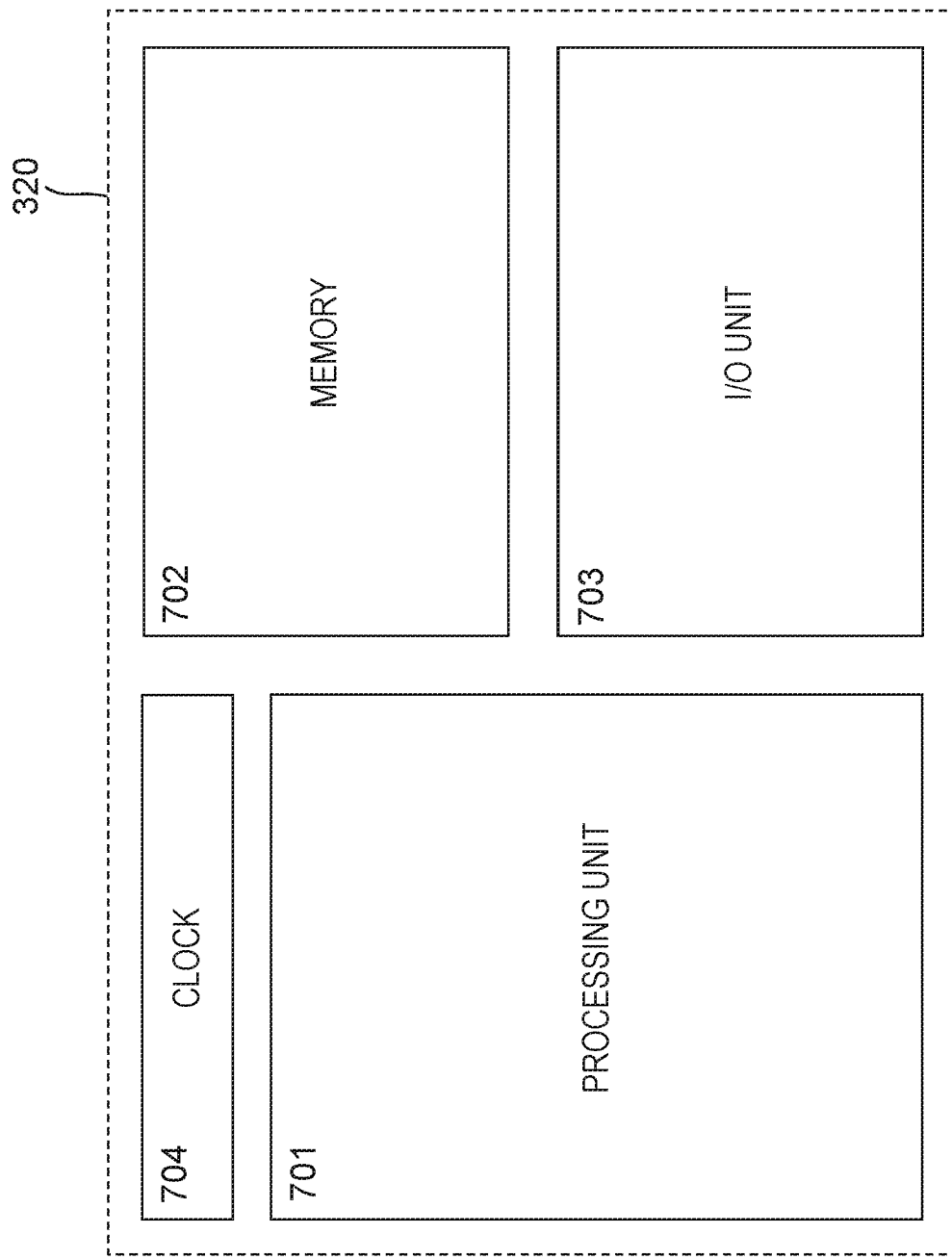
FIG. 7 shows schematically an exemplary hardware implementation of the present invention.

FIG. 7 illustrates yet another aspect of the present invention, where an alignment tool, e.g. the alignment tool 320 described above, may be implemented as a processing unit 701, a memory 702, an input/output (I/O) unit 703 and a clock 704. The processing unit 701, the memory 702, the I/O unit 703 and the clock 704 may be interconnected. The processing unit 701 may comprise a central processing unit (CPU), digital signal processor (DSP), multiprocessor system, programmable logic, field programmable gate array (FPGA) or application specific integrated circuit (ASIC) or any other type of logic. The memory 702 may comprise random access memory (RAM), read only memory (ROM) or any other type of volatile or non-volatile memory. The I/O unit 703 may comprise a display, a touch sensitive display, a keyboard, a mouse, a touch pad or any other type of input/output device It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. An alignment tool for a reflector arrangement, the reflector arrangement comprising a flat reflective surface configured to reflect an electromagnetic wave signal between a first antenna site and a second antenna site, the alignment tool comprising:
   a camera for capturing images of a field-of-view, wherein the camera is configured to be mounted on the reflector arrangement such that the field-of-view is pointing in a direction perpendicular to the flat reflective surface;
   an input circuit configured to receive a user input, wherein the user input comprises the field-of-view coordinates of the first antenna site;
   a processing circuit configured to compute alignment information from the user input by applying the rule that the incident and the reflected angles to the flat reflective surface are equal in magnitude but opposite in sign; and
   a display circuit configured to display the field-of-view and the alignment information.

2. The alignment tool according to claim 1, wherein the alignment information comprises the field-of-view coordinates of the target reflection point to the first antenna site.

3. The alignment tool according to claim 1, wherein the user input further comprises the field-of-view coordinates of the second antenna site and the alignment information comprises the field-of-view coordinates of the midpoint between the first antenna site and the second antenna site.

4. The alignment tool according to claim 1, wherein the input circuit, the processing circuit and display circuit are comprised in a portable device connected to the camera circuit.

5. The alignment tool according to claim 4, wherein the portable device is wirelessly connected to the camera circuit.

6. The alignment tool according to claim 1, wherein the input circuit is a touch sensitive display showing the field-of-view of the camera circuit.

7. The alignment tool according to claim 1, wherein the field-of-view coordinates comprises vertical and horizontal coordinates.

8. The alignment tool according to claim 1, wherein the processing circuit is further configured to compute a motion vector between the field-of-view image before and the field-of-view image after adjustment of the flat reflective surface and to compute an updated user input by adding the motion vector to the user input.

9. A method for alignment of a reflector arrangement, the reflector arrangement comprising a flat reflective surface configured to reflect a millimetre wave signal between a first antenna site and a second antenna site, the method comprising the steps of:

mounting a camera circuit on the reflector arrangement, the camera circuit being configured for capturing images of a field-of-view, and the mounting being performed such that the field-of-view is pointing in a direction perpendicular to the flat reflective surface;

receiving a user input from an input circuit, wherein the user input comprises the field-of-view coordinates of the first antenna site;

computing alignment information from the user input in a processing circuit, wherein the alignment information is computed by following the rule that the incident and the reflected angles to the flat reflective surface are equal magnitude but opposite in sign; and displaying the field-of-view and the alignment information on a display circuit.

10. The method for alignment according to claim 9, wherein the alignment information comprises the field-of-view coordinates of the target reflection point to the first antenna site.

11. The method for alignment according to claim 9, wherein the user input further comprises the field-of-view coordinates of the second antenna site and the alignment information comprises the field-of-view coordinates of the midpoint between the first antenna site and the second antenna site.

12. The method for alignment according to claim 9, wherein receiving a user input from an input circuit comprises receiving a user input from a touch sensitive display showing the field-of-view of the camera circuit.

13. The method for alignment according to claim 9, wherein the field-of-view coordinates comprises vertical and horizontal coordinates.

14. The method for alignment according to claim 9, wherein the computing further comprises computing a motion vector between the field-of-view image before and the field-of-view image after adjustment of the flat reflective surface and computing an updated user input by adding the motion vector to the user input.

* * * * *